United States Patent [19]
Lalancette

[11] 3,790,370
[45] Feb. 5, 1974

[54] REMOVAL AND RECOVERY OF METALS FROM POLLUTED WATERS

[75] Inventor: Jean-Marc Lalancette, Sherbrooke, Quebec, Canada

[73] Assignee: Universite de Sherbrooke, Sherbrooke, Quebec, Canada

[22] Filed: Dec. 23, 1971

[21] Appl. No.: 211,617

[52] U.S. Cl............... 75/108, 75/121, 210/42, 423/99, 423/580, 423/592
[51] Int. Cl. ... C01g 13/02, C22b 43/00, C01b 5/00
[58] Field of Search... 75/108, 121; 210/42; 423/99, 423/100, 561, 580, 592

[56] References Cited
UNITED STATES PATENTS

| | | | |
|---|---|---|---|
| 3,695,838 | 10/1972 | Knepper et al. | 75/121 |
| 3,476,552 | 11/1969 | Parks et al. | 75/121 |
| 3,719,473 | 3/1973 | Waiss, Jr. et al. | 75/121 |
| 3,718,457 | 2/1973 | Entwisle et al. | 75/108 |

Primary Examiner—Oscar R. Vertiz
Assistant Examiner—Hoke S. Miller
Attorney, Agent, or Firm—Cushman, Darby & Cushman

[57] ABSTRACT

A process for removing metal ions such as mercury, copper, cadmium, zinc, lead, nickel or silver from polluted waters includes causing the metal polluted water and a sulfur-containing precipitating agent to diffuse through peat whereby a water insoluble sulfide of the metal is formed and is adsorbed on the peat and the metal free water is recovered. The process also relates to recovering the metal either as metal oxide or as metal in the case of silver, copper and mercury by burning the metal sulfide-containing peat.

10 Claims, 1 Drawing Figure

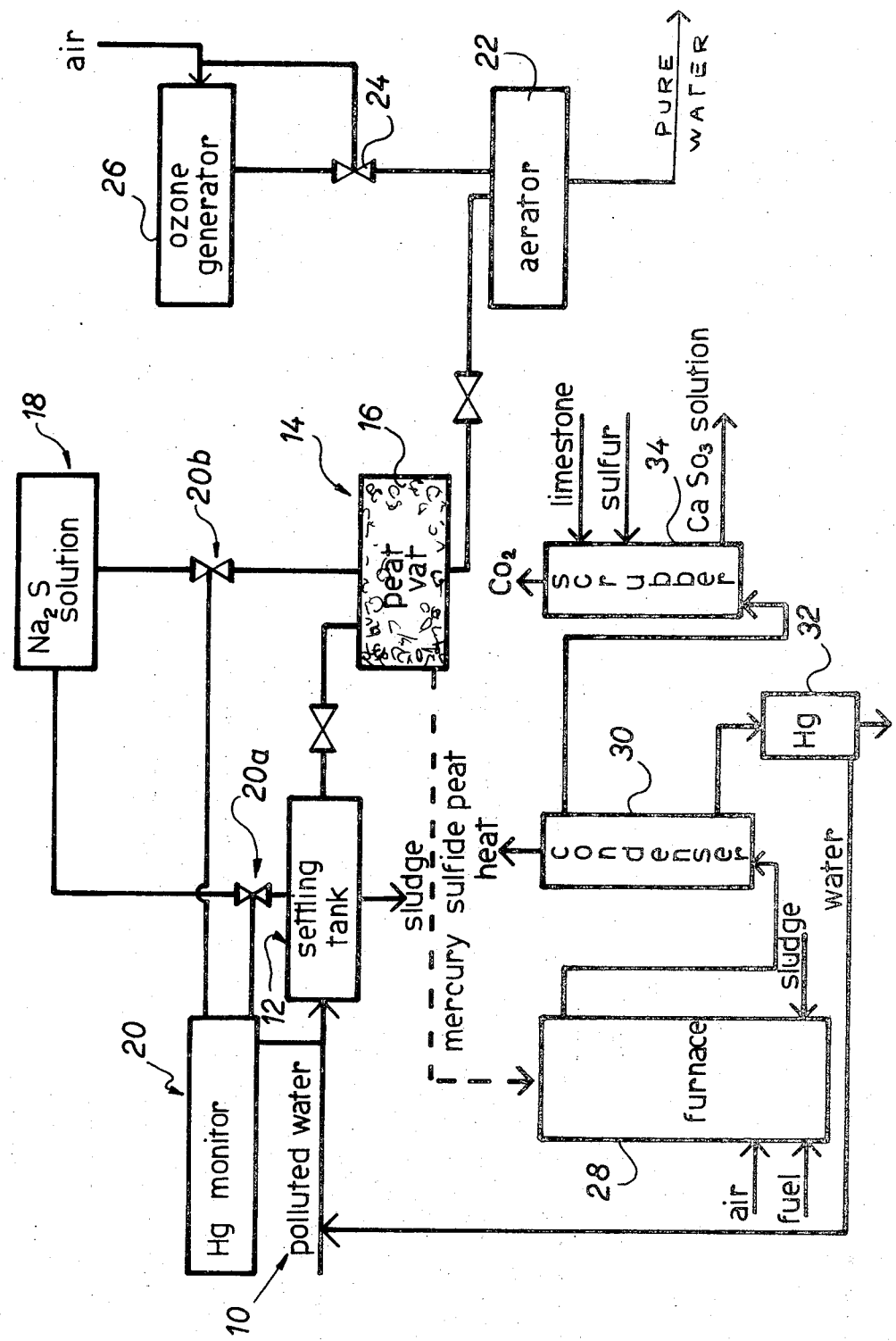

3,790,370

REMOVAL AND RECOVERY OF METALS FROM POLLUTED WATERS

The present invention relates to a process for separating metals from metal contaminated waters and to a process for recovering said metals in substantially quantitative yields.

PRIOR ART

Contamination of industrial waters by the discharge therein of various industrial waste materials such as mercury, copper, cadmium, zinc and other metals or salts is causing great concern to ecologists. Metal contamination renders the water poisonous to aquatic life or unsatisfactory for water supply purposes because of toxicity. In most metal contamination the metal if found as a soluble salt such as carbonates, cyanates, chlorides, etc. The usual methods for removing toxic metal salts from industrial waters comprise flocculation, chelation, and/or precipitation. Most of the methods are quite expensive and in many cases do not provide complete removal of the contaminating metal to the very low concentrations required by governmental regulations.

THE INVENTION

In accordance with one aspect of the present invention, metal or metal salt contaminated water is contacted with a precipitating agent while filtering through peat whereby the filtered water is completely devoid of any metallic ions. In a second aspect of the present invention the peat moss containing the precipitated salt of the metal contaminant is pyrolyzed to recover the metal as pure metal or as metal oxide, depending on the contaminant.

More specifically, the invention comprises treating a metal or metal salt contaminated water with a precipitating agent thereby to form a substantially insoluble sulfide while allowing the water to filter through a bed of peat. The filtered water contains no detectable trace of metal and after aeration or treatment with ozone, the treated water is suitable for industrial or home consumption.

In practice the contaminated water is circulated in a settling tank at low velocity whereby any metallic compound and sludge present therein are readily removed. In some cases, it is possible to isolate the metal contaminated water from the surface of other used water thereby decreasing the volume of the water to be treated and thus the size of the treating unit to a minimum.

The precipitation of the contaminant metallic ions can be carried out by causing the metal contained water and the precipitating agent to flow through the bed of peat at the same time, or adding the precipitating agent to the metal contaminated water and causing the combined solution to flow through the bed of peat or alternatively the bed of peat can be impregnated first with metal contaminated water and the precipitating agent is caused to flow through the contaminated water impregnated peat. In all case the precipitated sulfide is retained by the peat and metal free water is obtained. The metal contaminated waters which can be purified in accordance with the present invention are those containing mercury, cadmium, zinc, lead or copper, all of which form practically water insoluble sulfides. These contaminating metals are found in industrial waters in emulsion or suspension form or in solution as salts such as the arsenate, bromate, bromide, carbonate, chlorate, chloride, chromate, cyanide, fluoride, fulminate, hydroxide, iodate, iodide, nitrate, oxalate, oxide, phosphate or sulfate.

As precipitating agent there is used a sulfur containing compound which in solution will form an insoluble sulfide with metal contaminant. As precipitating agent there is used sodium sulfide, ammonium polysulfide or sulfidrhyl bearing compounds of the formula R–SH wherein R is alkyl or phenyl, for example, hexanethiol. The concentration of the precipitating agent is such that there is an excess of the amount required to precipitate the metallic ion contaminant.

As filtering agent there is used peat in any of the forms naturally available, commercial available or artificially dried. The advantage of peat is that it is fibrous and it has a polar surface, therefore making it suitable for greater adsorption than most filtering aids and further peat has a very large adsorption surface in ratio to its weight. A great advantage of using peat is because it is a readily available material at very low cost.

The process of the present invention is particularly suitable for the treatment of mercury containing waste waters and the removal of mercury from such water will now be described in detail by reference to the drawing which is a flow sheet illustrating the separation of mercury from waste water and the recovery of mercury.

From the settling tank 12, the water containing mercury either solution, emulsion or suspension in colloidal or in soluble salt form is transferred to the precipitating and filtering vat 14 containing commercial peat 16. The peat 16 may be previously impregnated with a precipitating solution 18 of sodium sulfide or the precipitating solution 18 and the water from the settling tank 12 are allowed to diffuse together through the peat. Alternatively, the polluted water from the tank 12 is transferred to the peat vat 14 and then the sodium sulfide solution is allowed to diffuse through the polluted water impregnated peat vat. Upon contact of the mercury contaminated water and of the sodium sulfide there is formed a water-insoluble precipitate of mercury sulfide which is adsorbed on the peat. The filtered water is then allowed to stand in aerator 22 and any excess sodium sulfide therein can readily be oxidized by aeration through adjustment of valve 24 or treatment with ozone from the ozone generator 26. The concentration of the precipitating solution is adjusted according to the concentration of the mercury in the waste water through the mercury monitor 20 which will also control the flow of the sodium sulfide solution 18 into the settling tank 12 through valve 20a or through the peat vat 14 through valve 20b. An amount slightly higher than the stoichiometric amount required to convert the mercury to insoluble mercury sulfide is used.

Alternatively, the mercury contaminated waste water and sodium sulfide may be mixed and stored in the tank 12 and the mixture then is allowed to diffuse through vat 14. Another possibility is that before allowing the mercury contaminated water to diffuse through vat 14, the peat 16 is first saturated with the sodium sulfide solution or the polluted water.

In practice it has been found that the pH of the mercury contaminated water can vary from 3 to 12 but when the pH is outside of this range the pH of the water can be adjusted by acidification with an acid such as hydrochloric acid or alkalinization with an alkaline metal hydroxide such as lime or sodium hydroxide.

With regard to the peat 16 the amount used is preferably in a ratio of at least 15 to 1 in weight of the precipitating agent, this ratio being preferred because it avoids any adverse effects of the sodium sulfide or other precipitating agents used on the structure of the peat moss. In fact lower ratios of peat to precipitating solution will cause disintegration of the peat structure thus voiding its adsorption action. Also when using this ratio, the peat moss will easily retain from 5 to 7 percent of its weight of mercury.

Another important factor is that the speed of flow of the mercury contaminated water and the sodium sulfide solution must necessarily be adjusted to provide sufficient time for diffusion of the solutions through the peat. Obviously the adjustment will take into consideration the surface and volume of the filtering vat.

Having now described the separation of the mercury from waste waters and its adsorption on the peat, there will now be described the process for recovering the mercury from the peat, which process is also a feature of the present invention.

The peat containing the mercury sulfide is first removed from the vat 16, compressed and dried for a few days to bring the moisture content down to about 50 percent. It is then transferred to a furnace 28 and burnt at the lower portion of the furnace. The burning is carried out with fuel and air at a temperature of from 400°–500° C., the air intake being adjusted to obtain a minimum of smoke and the flue gases formed are submitted to pyrolytic temperatures in the upper portion of the furnace 28, for example 500° to 700° C. before leaving the furnace. The pyrolytic temperature will avoid the formation of dimethyl mercury or other volatile mercury derivatives which are a most toxic gas. Also with the pyrolytic temperatures there is avoided the production of tar or other condensable gas while favouring the formation of water and mercury vapors and sulfur dioxide.

The gases are then passed through a water-cooled condensor 30 whereby metallic mercury is recovered from the condensed water 32. Any uncondensed vapors of mercury and sulfur dioxide are then eliminated by passing in a scrubbing tower 34 containing limestone and elemental sulfur. There is formed some calcium sulfite which can be used in the pulp and paper industry. Carbon dioxide gas is also formed in the scrubber 34 and is allowed to escape in the atmosphere. There may also be formed some mercury sulfide which can be reprocessed in the furnace 28 with the next batch. The condensed water 32 which represents about 1 percent of the treated water may be recycled with the polluted water 10.

When treating water contaminated with metals other than mercury, such as copper, cadmium, lead, zinc, nickel or silver, the same method is used for purifying the water, but for the recovery of the metal as the oxide, the peat containing the metal sulfide is burnt in the furnace at a temperature of from 400°–500° C. and the flue gases are pyrolyzed. The residue will be the metal oxide or metal in the case of silver and copper and mercury.

EXAMPLE 1

A solution (1 litre) of 2 percent of mercury (as $HgCl_2$) was stirred in the presence of metallic mercury. After allowing the solution to settle, it was flown over five pads of peat, 1 inch thick and 5 inches in diameter. Each pad weighed approximately 55 g and had been impregnated with a 1 percent solution of $Na_2S$. The effluent water had the same volume as the starting solution, since the peat was saturated with moisture. The concentration of mercury was lower than 1 ppb as determined with a "dial Atom" apparatus (Jarrell Ash) with a Hg hollow cathode.

After this treatment, the peat was wrung and left to dry for a few days. The moisture content of the peat was then decreased from 85 percent to a value of the order of 50 percent, the weight being reduced accordingly. This dry peat was then burned at 400° C. using 0.1 cc of air per gram of peat per minute. The effluent gases were heated at 600° C. for approximately 30 seconds, before leaving the furnace. The condensate was collected and the mercury recovered by decantation. Starting with a solution containing 2.71 g of $HgCl_2$, 2.0 g of mercury was recovered, a quantitative yield.

The cooled gases were passed through a 1 inch × 24 inch tube containing wet limestone chips about one-fourth inch in diameter mixed with 5 percent in weight of sulfur. The removal of $SO_2$ was quantitative and no mercury vapors could be found in the effluent gases.

EXAMPLE 2

By proceeding in the same manner as in Example 1 and using an acid solution of mercury acidified to pH 3 with HCl, the results were identical to Example 1.

EXAMPLE 3

The procedure of Example 1 was used using a basic solution of mercury made alkaline to pH 12 with sodium hydroxide. The results were identical to Example 1.

EXAMPLE 4

The procedure of Example 1 was followed except that 1 liter of solution of mercury was stirred with 15 g. of peat in the presence of $Na_2S$ (0.30 g). After filtration of the solution over a pad of peat, the results obtained were similar to Example 1.

EXAMPLE 5

The procedure of Example 1 was used except that the solution of $Na_2S$ (20 ml) was flown simultaneously as the solution of mercury over the peat at a rate fast enough to precipitate the mercury. The results obtained were similar to Example 1.

EXAMPLE 6

The procedure of Example 1 was used except that the water solution of mercury was rendered "hard" by addition of 1 percent in weight of calcium ($CaCl_2$), magnesium ($MgSO_4$) and iron $Fe_2(SO_4)_3$. The results of the experiment indicated that the method was not affected by the hardness of water, the elimination of Hg being quantitative.

EXAMPLE 7

A solution of 1.35 g of cupric chloride in 1 litre of water was treated as in Example 1. The effluent water (approximately one litre) contained no copper (test by $H_2S$). In the ashes of the combustion of peat, a mixture of copper and copper oxide was found weighing 0.70 g.

EXAMPLE 8

A solution of 3.31 g of lead nitrate in 1 litre of water was treated as in Example 1. The resulting water contained no lead (test with $H_2S$) which was found as oxide (2.2 g) in the ashes of the furnace.

EXAMPLE 9

A solution of 1.83 g of cadmium chloride in 1 litre of water was treated as in Example 1. The effluent solution contained no cadmium (test with $H_2S$) which was recovered as a partly sublimed oxide in the furnace. It has not been possible to obtain an exact weight of cadmium oxide.

EXAMPLE 10

A solution of 1.61 g of zinc sulfate in 1 litre of water was treated as in Example 1. The effluent solution contained no zinc (test with $H_2S$) which was recovered as oxide and difficult to weight (0.4 g) under the experimental conditions used.

EXAMPLE 11

A solution of 1.55 g of nickel sulfate in 1 litre of water was treated as in Example 1. The effluent solution contained no nickel (test with $H_2S$) which was recovered in the ashes (0.5 g) as oxide.

EXAMPLE 12

A solution of 1.70 g of silver nitrate in 1 litre of water was treated as in Example 1. The effluent solution contained no silver (test with $H_2S$) which was recovered in the ashes (1.1 g) as metal.

EXAMPLE 13

A solution (200 ml. pH 12) obtained from waste water of a chlorine alkali plant and containing 500 part per million of mercury was stirred with 25 g of peat for 1 hour. Then a solution of 1.5 g of sodium sulfide in 5 ml of water was added and the stirring continued for 30 min. Upon filtration the water contained 10.0 part per billion of mercury, determined with a Hg hollow cathode.

What is claimed is:

1. A process for removing metallic ions selected from mercury, copper, cadmium, zinc, lead, nickel and silver, from polluted waters, which comprises causing said metal polluted water and a sulfur-containing precipitating agent to diffuse through peat, the ratio of peat to precipitating agent being at least 15 to 1, whereby a water insoluble sulfide of the metal is formed and is adsorbed on the peat and metal free water is recovered.

2. A process for removing mercury ions from mercury polluted waters which comprises causing a mercury polluted water to diffuse through peat with a solution of sulfur-containing precipitating agent whereby there is formed an insoluble mercury sulfide which is adsorbed by the peat, the ratio of peat to the precipitating agent being at least 15 to 1, and recovering mercury free water.

3. The process of claim 2 wherein the sulfur-containing precipitating agent is sodium sulfide.

4. The process of claim 3 wherein the mercury polluted water is diffused through peat which has been previously impregnated with a sodium sulfide solution.

5. The process according to claim 2 wherein the mercury polluted water and sodium sulfide solution are combined before permitting the mixture to diffuse through the peat.

6. The process of claim 2 wherein the sodium sulfide solution diffuses through peat which has been impregnated with the mercury polluted water.

7. The process according to claim 1 wherein the water insoluble metal sulfide is mercury sulfide and the peat containing the mercury sulfide is partially dried, subjected to oxidation in a furnace and the flue gases obtained are condensed to recover liquid mercury.

8. The process of claim 7 wherein the oxidation is at a temperature of 400°–700° C.

9. The process according to claim 1 wherein the water insoluble metal sulfide is selected from the group consisting of copper, cadmium, zinc, lead, nickel and silver sulfides and the peat containing the metal sulfide is partially dried, subjected to oxidation in a furnace and the metal is recovered as a member of the group consisting of (1) the metal as such and (2) metal oxide.

10. The process of claim 9 wherein the oxidation is at a temperature of 400°–700° C.

* * * * *